(12) United States Patent
Satake et al.

(10) Patent No.: US 10,268,221 B2
(45) Date of Patent: Apr. 23, 2019

(54) POWER SUPPLY DEVICE AND ELECTRONIC CONTROL UNIT FOR LOWERING A MINIMUM OPERATING VOLTAGE AND SUPPRESSING A CONSUMED CURRENT TO BE LOW

(71) Applicant: DENSO CORPORATION, Kariya, Aichi-pref. (JP)

(72) Inventors: Hiroyuki Satake, Kariya (JP); Shinya Uemura, Kariya (JP); Yuki Mikami, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/780,361

(22) PCT Filed: Feb. 20, 2017

(86) PCT No.: PCT/JP2017/006144
§ 371 (c)(1),
(2) Date: May 31, 2018

(87) PCT Pub. No.: WO2017/195427
PCT Pub. Date: Nov. 16, 2017

(65) Prior Publication Data
US 2018/0348804 A1 Dec. 6, 2018

(30) Foreign Application Priority Data
May 12, 2016 (JP) ................................ 2016-096050

(51) Int. Cl.
*H02M 3/158* (2006.01)
*G05F 1/56* (2006.01)
(Continued)

(52) U.S. Cl.
CPC .............. *G05F 1/56* (2013.01); *H02J 7/0065* (2013.01); *H02M 1/36* (2013.01); *H02M 3/156* (2013.01);
(Continued)

(58) Field of Classification Search
CPC .... G05F 1/56; G05F 1/59; G05F 1/595; H02J 7/0065; H02M 1/36; H02M 3/156; H02M 2001/0054
(Continued)

(56) References Cited

U.S. PATENT DOCUMENTS 6,469,478 B1 * 10/2002 Curtin .................. H02M 3/156
323/266
6,707,280 B1 * 3/2004 Liu ......................... G05F 1/618
323/224
(Continued)

FOREIGN PATENT DOCUMENTS

JP 2004-153931 A 5/2004
JP 2015-159642 A 9/2015

*Primary Examiner* — Alex Torres-Rivera
(74) *Attorney, Agent, or Firm* — Posz Law Group, PLC (57) ABSTRACT

A power supply device comprises: a first linear regulator, which receives a voltage from a direct-current power supply at all times and outputs a first voltage; a step-down switching regulator, which receives the voltage from the direct-current power supply through a path via a power supply switch and outputs an intermediate voltage, and a second linear regulator, which receives the intermediate voltage and outputs a second voltage. The power supply device outputs a higher one of the first voltage and the second voltage. The first linear regulator has a smaller current consumption and a higher minimum operating voltage than the second linear regulator. When the voltage supplied from the direct-current power supply is lower than or equal to a predetermined threshold value, the switching regulator drives a main switching component interposed in series with a voltage
(Continued)

input-output path to turn on at all times. The second linear regulator executes an output operation of the second voltage during a full-on period, during which the main switching component is driven to turn on at all times.

10 Claims, 8 Drawing Sheets

(51) Int. Cl.
*H02M 3/156* (2006.01)
*H02J 7/00* (2006.01)
*H02M 1/36* (2007.01)
*H02M 1/00* (2006.01)

(52) U.S. Cl.
CPC .... *H02M 3/158* (2013.01); *H02M 2001/0054* (2013.01)

(58) Field of Classification Search
USPC .................. 323/226, 269, 270, 273–281, 303
See application file for complete search history.

(56) References Cited

U.S. PATENT DOCUMENTS

| | | | |
|---|---|---|---|
| 2005/0213354 A1* | 9/2005 | Pai | H02M 3/156 363/21.06 |
| 2007/0200539 A1* | 8/2007 | Ganti | G05F 1/56 323/282 |
| 2008/0076484 A1* | 3/2008 | Veselic | G06F 1/26 455/572 |
| 2009/0184700 A1 | 7/2009 | Kanayama | |
| 2015/0076906 A1* | 3/2015 | Tamegai | H02M 3/156 307/31 |
| 2015/0346746 A1* | 12/2015 | Huang | G05F 1/56 323/313 |
| 2015/0357839 A1* | 12/2015 | Cai | A24F 47/008 131/329 |
| 2018/0129234 A1* | 5/2018 | Melgar | H02M 3/158 |

* cited by examiner

| STEP-DOWN SWITCHING POWER SUPPLY SUPPORT | SWITCHING OPERATION | MAIN AMP | SUB-AMP |
|---|---|---|---|
| 5.2V ≤ BATT ≤ 60V | SWITCHING | OPERATION | STOP |
| 4.3V ≤ BATT < 5.2V | FULL-ON | OPERATION | OPERATION |
| 0 ≤ BATT < 4.3V | STOP | STOP | STOP |

FIG. 8

POWER SUPPLY DEVICE AND ELECTRONIC CONTROL UNIT FOR LOWERING A MINIMUM OPERATING VOLTAGE AND SUPPRESSING A CONSUMED CURRENT TO BE LOW

CROSS REFERENCE TO RELATED APPLICATIONS

The present application is based is a U.S. national stage application of International Application No. PCT/JP2017/006144 filed on Feb. 20, 2017 and on Japanese patent application No. 2016-096050 filed on May 12, 2016, the contents of which are incorporated herein by reference.

TECHNICAL FIELD

The present disclosure relates to a power supply device and an electronic control unit, which includes the power supply device.

BACKGROUND

In a conventional power supply device of an electronic control unit, which is mounted in a vehicle, for example, it is necessary to supply power to a microcomputer (hereinafter referred to as computer) operable even in an off-period of a main power supply switch, which is turned on and off in conjunction with an ignition switch. For this reason, the power supply device uses a power supply circuit of small current consumption in many cases. As the power supply circuit of such small current consumption, a linear regulator, which uses N-channel type MOS transistors as switching components for voltage control, is typical.

PRIOR ART LITERATURE

Patent Literature

Patent Literature 1: JP 2009-177909A

SUMMARY

However, a minimum operating voltage of the linear regulator using the N-channel type MOS transistors is high. For this reason, in the power supply device using the linear regulator described above, it is likely that power supply to the computer is disabled when a battery voltage falls because of cranking in an on-period of the power supply switch.

It is therefore an object of the present disclosure to provide a power supply device and an electronic control unit, which is capable of lowering a minimum operating voltage during an on-period of a power supply switch while suppressing a consumed current to be low during an off-period of the power supply switch.

According to a first aspect of the present disclosure, a power supply device comprises a first linear regulator, a switching regulator of a step-down type and a second linear regulator. The first linear regulator receives a voltage from a direct-current power supply at all times and outputs a first voltage. The switching regulator receives the voltage from the direct-current power supply through a path via a power supply switch and outputs an intermediate voltage. The second linear regulator receives the intermediate voltage and outputs a second voltage. The power supply device is configured to output a higher one of the first voltage and the second voltage through an output terminal.

In the configuration described above, the first linear regulator has a configuration of smaller current consumption and a higher minimum operating voltage than the second linear regulator. Further, the switching regulator is configured to drive a main switching component interposed in series with an input-output path of the voltage to turn on at all times, when the voltage inputted from the direct-current power supply is lower than or equal to a predetermined threshold value. The second linear regulator executes an output operation of the second voltage during a full-on period, during which the main switching component of the switching regulator is driven to be in an on-state at all times.

According to the configuration described above, during an off-period of the power supply switch, the operation of the second linear regulator is stopped and the operation of the first linear regulator is executed. Thus, during the off-period of the power supply switch, the voltage output operation is executed from the output terminal by the operation of the first linear regulator, a consumption current of which is smaller than that of the second linear regulator. Further, during the on-period and the full-on period of the power supply switch, both operations of the first linear regulator and the second linear regulator are executed. Thus, when the voltage supplied from the direct-current power supply falls to be equal to or lower than a predetermined value, the voltage output operation is executed by not only the operation of the first linear regulator but also a support operation of the second linear regulator, a minimum operating voltage of which is lower than that of the first linear regulator. As a result, according to the configuration described above, it is possible to provide an advantage that the minimum operating voltage can be lowered during the on-period of the power supply switch while suppressing the consumption current to be low during the off-period of the power supply switch.

BRIEF DESCRIPTION OF THE DRAWINGS

The above and other objects, features and advantages of the present disclosure will become more apparent from the following detailed description made with reference to the accompanying drawings. In the drawings.

EMBODIMENTS

Plural embodiments of the present invention will be described below with reference to the drawings. In each embodiment, substantially same configuration is designated with a same reference numeral to simplify the description.

First Embodiment

A first embodiment will be described with reference to FIG. 1 to FIG. 7.

Figure 1:
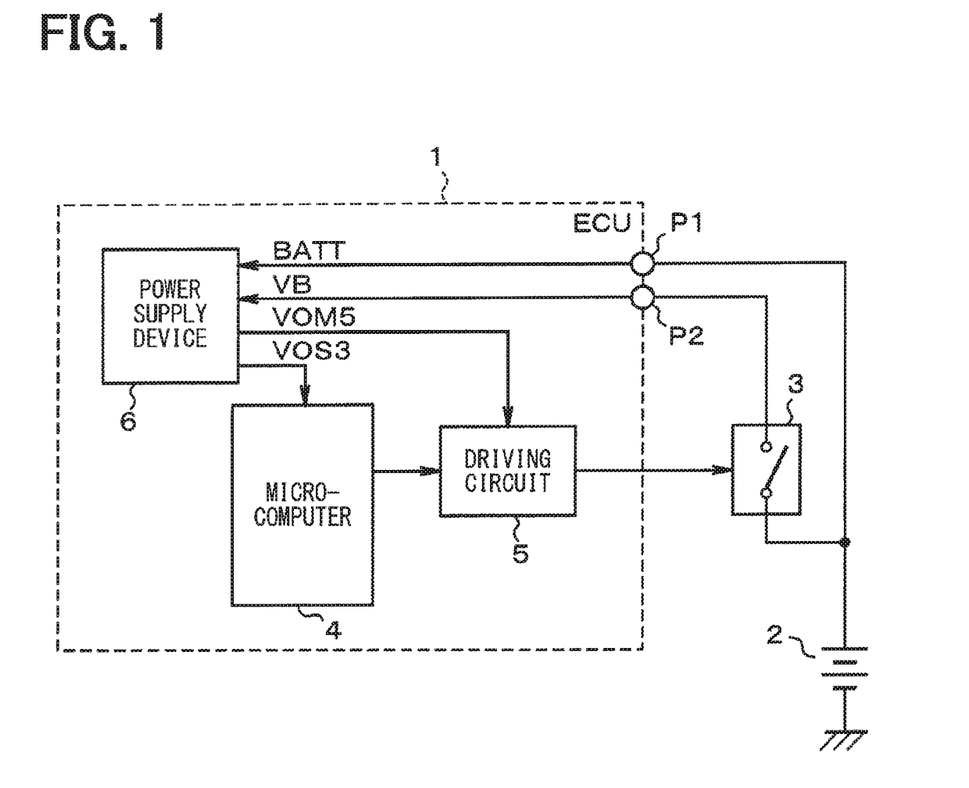
FIG. 1 is a diagram showing schematically a configuration of an electronic control unit according to a first embodiment.

As shown in FIG. 1, an electronic control unit (hereinafter referred to as ECU) 1 controls an engine mounted in a vehicle. A power supply terminal P1 of the ECU 1 is connected to a high-potential side terminal of a battery 2 mounted in the vehicle. A power supply terminal P2 of the ECU 1 is connected to the high-potential side terminal of the battery 2 through a contact of a main relay 3. The battery 2 corresponds to a direct current power supply. In the following description, voltages supplied to the ECU 1 through the power supply terminal P1 and the power supply terminal P2 are referred to as a voltage BATT and a voltage VB, respectively. These voltage BATT and the voltage VB are, for example, 12V as normal voltage values but may occasionally rise up to at most 60V because of load dumping.

A microcomputer (hereinafter referred to as computer) 4 corresponds to a control part, which controls an entire operation of the ECU 1. A driving circuit 5 drives the main relay 3 in response to a control signal outputted from the computer 4. The main relay 3 corresponds to a power supply switch, which is turned on and off in conjunction with an ignition switch (not shown) of the vehicle. Specifically, the contact of the main relay 3 is closed when the ignition switch is turned on and the contact of the main relay 3 is opened when the ignition switch is turned off.

The voltage BATT and the voltage VB are supplied to a power supply device 6. Receiving the voltages BATT and VB, the power supply device 6 generates and outputs two kinds of voltages VOS3 and VOM5. The voltage VOS3 (for example, 3.3V) is supplied to the computer 4, which is operative even during an IGOFF period, that is, even during a period that the ignition switch is in an off-state. The voltage VOM5 (for example, 5.0V) is supplied to other internal circuits of the ECU 1. In the following description, the voltage VOS3 is referred to as a voltage AMP OUT.

Figure 2:
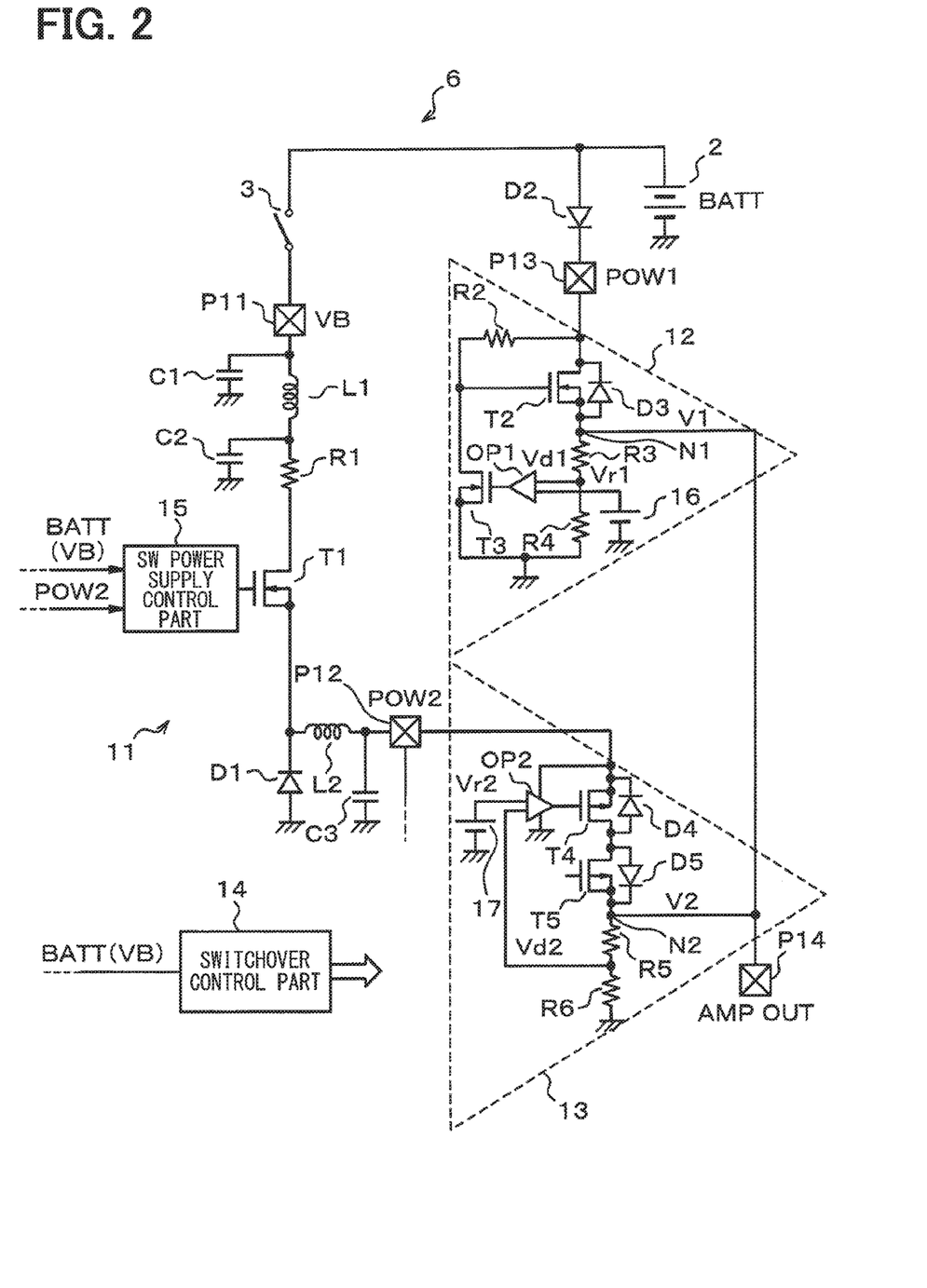
FIG. 2 is a diagram showing schematically a configuration of a power supply device.

As shown in FIG. 2, the power supply device 6 includes a switching power supply 11, a main amplifier 12, a sub-amplifier 13 and a switchover control part 14. The switching power supply 11 is a switching regulator of a step-down type. The voltage VB is supplied to the switching power supply 11 from the battery 2 through a path via the main relay 3. The switching power supply 11 steps down the voltage VB to an intermediate voltage POW2 (hereinafter simply referred to as voltage POW2) and outputs it to the sub-amplifier 13 and the like.

The switching power supply 11 includes inductors L1, L2, capacitors C1 to C3, a resistor R1, a transistor T1 and a diode D1. The transistor T1 is an N-channel type MOS transistor, a drain of which is connected to an input terminal P11, to which the voltage VB is supplied, through the resistor R1 and the inductor L1.

The resistor R1 is a shunt resistor for detecting an input current of the switching power supply 11. Both ends of the inductor L1 are connected to the ground, which provides a reference potential of circuits, through the capacitors C1 and C2, respectively. The inductor L1 and the capacitors C1, C2 form an LC filter.

A source of the transistor T1 is connected to an output terminal P12, which outputs the voltage POW2, through the inductor L2 and to a cathode of the diode D1. An anode of the diode D1 is connected to the ground. The capacitor C3 is connected between the output terminal P12 and the ground. The transistor T1 corresponds to a main switching component, which is interposed in series with a voltage input-output path in the switching power supply 11.

A driving signal outputted from a SW power supply circuit 15 is supplied to a gate of the transistor T1 so that driving of the transistor T1 is controlled by the SW power supply control part 15. The SW power supply control part 15 has a function of detecting the input current of the switching power supply 11, the voltage VB (=voltage BATT) and the voltage POW2. The function of detecting the voltage VB and the voltage POW2 may be realized by a conventional configuration, which uses a voltage dividing circuit formed of resistors, a voltage generating circuit formed of a band gap reference voltage circuit (hereinafter referred to as BGR) and a comparator having or not having hysteresis. An example of a band gap reference voltage circuit is provided in US Patent Application Publication No. 2015/0346746, which is incorporated herein by reference.

The SW power supply control part 15 feedback-controls driving of the transistor T1 based on the above-described detection values and the like so that the voltage POW2 is regulated to a target value (for example, 6.0V). Further, the SW power supply control part 15 turns on the transistor T1 at all times, that is, drives the transistor T1 to be in a full-on state, when the voltage BATT or the voltage VB falls, specifically the voltage BATT falls to be equal to or lower than a predetermined threshold value. Since the voltage BATT and the voltage VB have the same potential during the IGON period, during which the ignition switch is in an on-state, either one of the voltages may be used to determine the full-on driving.

In the following description, the period during which the transistor T1 is driven to be fully turned on is referred to as a full-on period. Driving to turn on at all times or fully includes not only a case that an on-duty of the driving signal for driving the transistor T1 is set to 100% but also cases that the on-duty is set to be close to 100% or the transistor T1 is driven to perform a switching operation at a frequency lower than that of normal time.

A diode D2, which blocks a reverse current flow, is connected between an input terminal P13 of the main amplifier 12 and the high-potential side terminal of the battery 2. Thus, the main amplifier 12 is supplied with a voltage POW1, which is lower than the voltage BATT of the battery 2 by a forward voltage of the diode D2, at all times. The main amplifier 12 receives the voltage POW1 and outputs a first voltage V1 and corresponds to a first linear regulator. The main amplifier 12 is a power supply circuit of a series regulator type, which includes transistors T2 and T3, resistors R2 to R4, an operational amplifier OP1 and a first reference voltage supply 16.

The transistor T2 is an N-channel type MOS transistor, a drain of which is connected to the input terminal P13 and to a gate through the resistor R2. Between a source-drain path of the transistor T2, a body diode D3 is formed with its anode at the source side. A source of the transistor T2 is connected to an output node N1 of the first voltage V1. The output node N1 is connected to an output terminal P14, which outputs a voltage AMP OUT. The transistor T2 is interposed in series with a voltage input-output path in the main amplifier 12 and corresponds to a voltage control switching component for controlling the first voltage V1, which is to be outputted.

Figure 3:
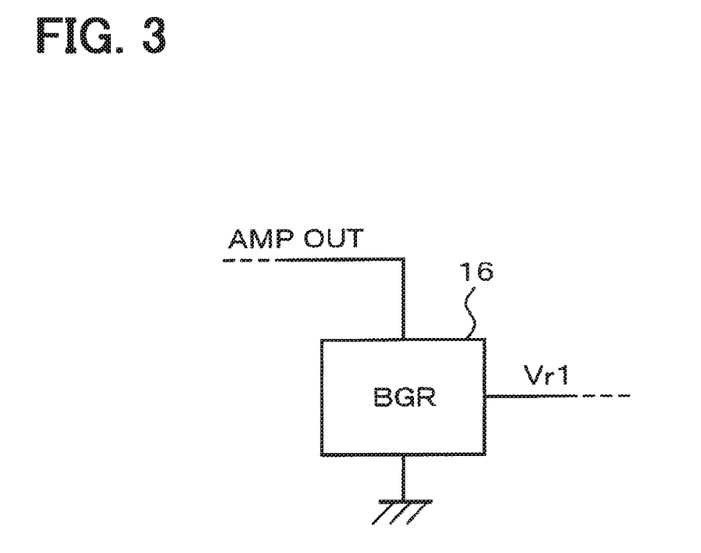
FIG. 3 is a diagram showing schematically a detailed exemplary configuration of a first reference voltage supply.

The first reference power supply 16 generates a first reference voltage Vr1, which corresponds to a target value (for example, 3.3V) of the first voltage V1 to be outputted. The first reference voltage Vr1 is supplied to one input terminal of the operational amplifier OP1. The first reference voltage supply 16 may be formed of a BGR, which operates with the voltage AMP OUT of the output terminal P14, as shown in FIG. 3, for example.

The resistors R3 and R4 are connected in series between an output node N1 and the ground. A voltage developed at a common connection node of the resistors R3 and R4, that is, a detection voltage Vd1 developed by dividing the first voltage V1 by the resistors R3 and R4, is supplied to the other input terminal of the operational amplifier OP1.

The operational amplifier OP1 outputs an error-amplifying signal, which corresponds to a difference between the first reference voltage Vr1 and the detection voltage Vd1, to a gate of the transistor T3. The transistor T3 is an N-channel type MOS transistor and connected between the gate of the transistor T2 and the ground. With this configuration, by driving control for the transistor T3 by the operational amplifier OP1, driving of the transistor T2 is feedback-controlled so that the first voltage V1 is regulated to the target value.

The sub-amplifier 13 outputs a second voltage V2 by receiving the voltage POW2 and corresponds to a second linear regulator. The sub-amplifier 13 is a power supply circuit of a series regulator type and includes transistors T4, T5, resistors R5, R6, an operational amplifier OP2 and a second reference voltage supply 17.

Both of the transistors T4 and T5 are P-channel type MOS transistors, drains of which are connected to each other. A source of the transistor T4 is connected to the output terminal P12 of the switching power supply 11. A source of the transistor T5 is connected to an output node N2 of the second voltage V2. An output node N2 is connected to an output terminal P14.

In source-drain paths of the transistors T4 and T5, body diodes D4 and D5 are formed with anodes at drain sides, respectively. The transistor T4 is interposed in series with a voltage input-output path in the sub-amplifier 13 and corresponds to a voltage control switching component, which controls the second voltage V2 to be outputted. The transistor T5 is interposed in series with the voltage input-output path in the sub-amplifier 13 and corresponds to a reverse-flow blocking MOS transistor, which blocks a reverse current flow from the output node N2 side. The transistor T5 blocks a current from flowing in reverse from the node N2 side to the output terminal P12 during an IGOFF period, in which the switching power supply 11 does not operate.

Figure 4A:
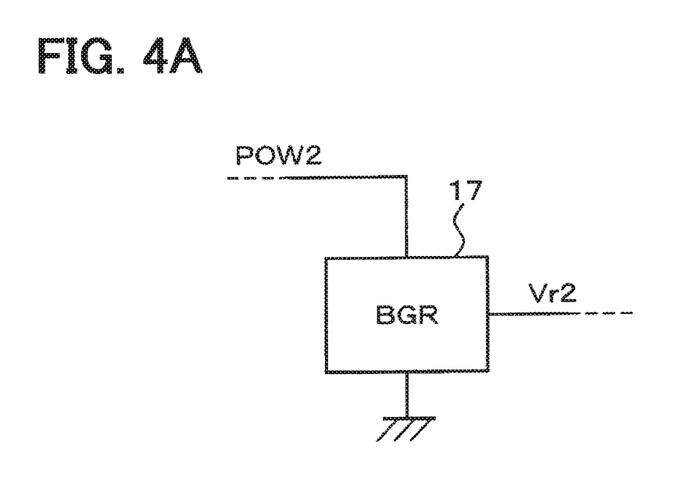
FIG. 4A is a diagram schematically showing a first detailed exemplary configuration of a second reference voltage supply.

The second reference voltage supply 17 generates a second reference voltage Vr2, which corresponds to a target value (for example, 3.3V) of the second voltage V2 to be outputted. The second reference voltage Vr2 is supplied to one input terminal of the operational amplifier OP2. The second reference voltage supply 17 may be formed of the BGR, which operates with the voltage POW2 of the output terminal P12, as shown in FIG. 4A, for example.

Figure 4B:
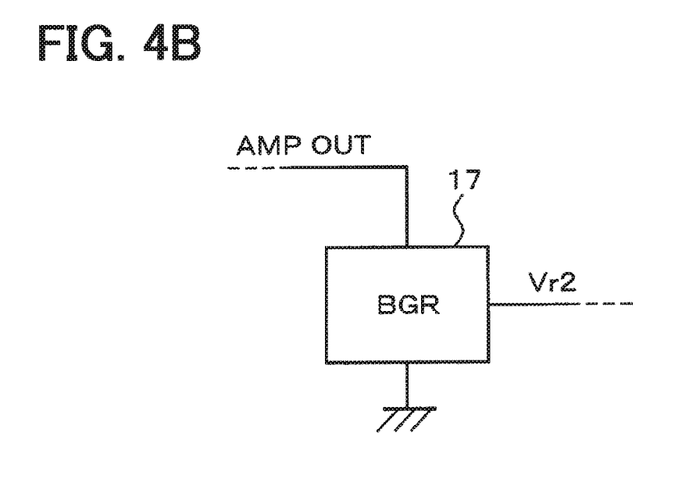
FIG. 4B is a diagram schematically showing a second detailed exemplary configuration of a second reference voltage supply.

Further, the second reference voltage supply 17 may be formed of the BGR, which operates with the voltage AMP OUT of the output terminal P14, as shown in FIG. 4B, for example. In case of the configuration shown in FIG. 4B, the second reference voltage supply 17 may be configured to share the BGR of the first reference voltage supply 16.

The resistors R5 and R6 are connected in series between the output node N2 and the ground. A detection voltage developed at a common connection node between the resistors R5 and R6, that is, a detection voltage Vd2 developed by dividing the second voltage V2 by the resistors R5 and R6 is supplied to the other input terminal of the operational amplifier OP2. The operational amplifier OP2 outputs an error amplifying signal, which corresponds to a difference between the second reference voltage Vr2 and the detection voltage Vd2, to a gate of the transistor T4.

Driving of the transistor T5 is controlled by a driving control part, which is not shown. The transistor T5 is turned on normally and turned off at abnormal time of an occurrence of abnormality. Thus, a voltage feedback control is executed so that the second voltage V2 is regulated to the target value by controlling driving of the transistor T4 by the operation amplifier OP2. Further, even when an abnormality arises, for example, the output terminal P14 is shorted to a high potential side, the reverse current flow from the node N2 side is blocked by the body diode D5 of the transistor T5.

The switchover control part 14 switches over an on-state and off state of the main amplifier 12 and the sub-amplifier 13 individually. That is, the switchover control part 14 switches over execution and stopping of an output operation of the first voltage V1 of the main amplifier 12 and switches over execution and stopping of an output operation of the second voltage V2 of the sub-amplifier 13.

The switchover control part 14 has a function of detecting the voltage VB (=voltage BATT) and corresponds to a power supply voltage detection part, which controls the above-described switchover based on the detection value of the voltage VB. The function of detecting the voltage VB may be realized by the conventional configuration as described above with respect to the description of the SW power supply control part 15. The function of detecting the voltage VB of the switchover control part 14 may be shared by the SW power supply control part 15, which has the similar function.

In the configuration described above, the output node N1 of the main amplifier 12 and the output node N2 of the sub-amplifier 13 are connected to each other and to the output terminal P14. In the voltage input-output path of the main amplifier 12, the diode D2 is interposed in a forward-biased direction. In the voltage input-output path of the sub-amplifier 13, the body diode D5 is interposed in a forward-biased direction. That is, each output of the main amplifier 12 and the sub-amplifier 13 is OR-connected. For this reason, the power supply device 6 is configured to output, as the voltage AMP OUT, a higher one of the first voltage V1 and the second voltage V2 through the output terminal P14.

The main amplifier 12 and the sub-amplifier 13 have the following features, respectively. That is, an N-channel type MOS transistor can generally have an on-resistance in a smaller size than a P-channel type MOS transistor. For this reason, the main amplifier 12 formed of using the N-channel type transistor T2 as the voltage control switching component has merits that a chip area can be reduced and the consumption current can be reduced relative to the sub-amplifier 13 formed of using the P-channel type transistor T4.

Further, generally, a minimum operating voltage of a series regulator formed of using a P-channel type MOS transistor is lower than that of a series regulator formed of using an N-channel MOS transistor owing to its configuration. Therefore the sub-amplifier 13 is more advantageous than the main amplifier 13 in that its minimum operating voltage can be lowered. That is, the main amplifier 12 is disadvantageous in that its minimum operating voltage is higher than that of the sub-amplifier 13.

Figure 5:
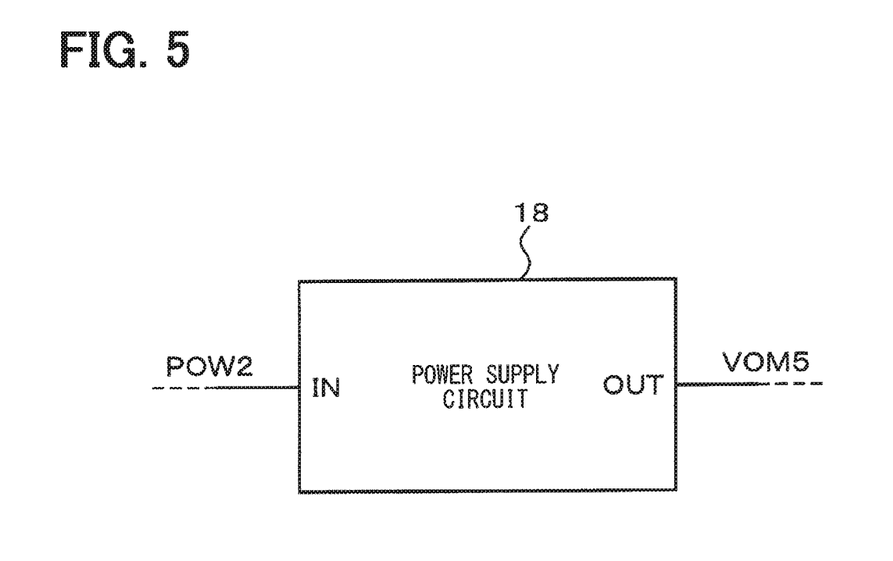
FIG. 5 is a diagram showing schematically an exemplary configuration of a power supply circuit, which generates VOM5.

The power supply device 6 has a power supply circuit 18 shown in FIG. 5 in addition to the configuration described above. The power supply circuit 18 receives the voltage POW2 outputted from the switching power supply 11 and outputs a voltage VOM5. This voltage VOM5 is supplied to an internal circuit, which operates only during the IGON period, which is the on-period of the ignition switch, among internal circuits of the ECU 1. The power supply circuit 18 is configured as a power supply circuit of a general series regulator type.

Figure 6:
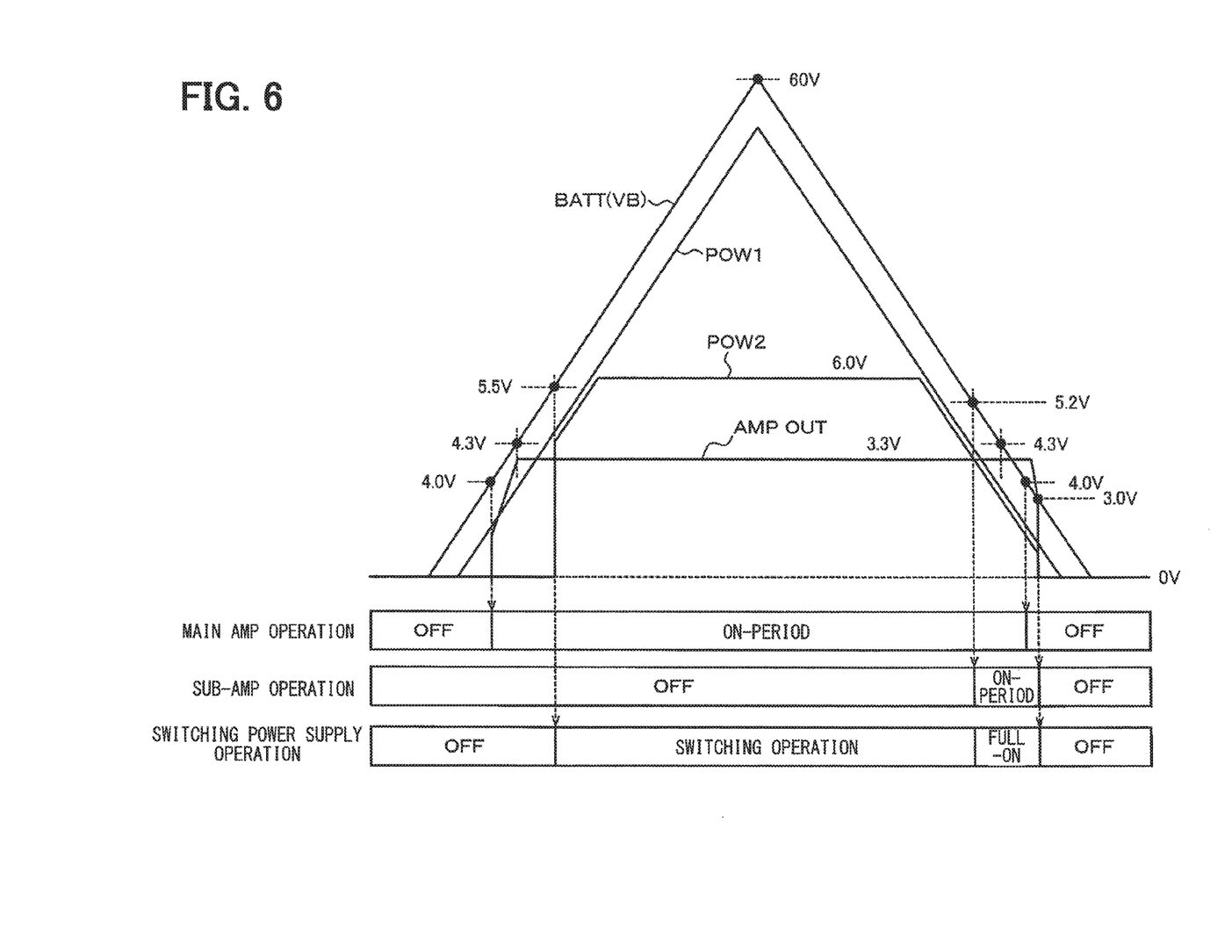
FIG. 6 is a sequence diagram showing schematically an operation of the power supply device.
Figure 7:
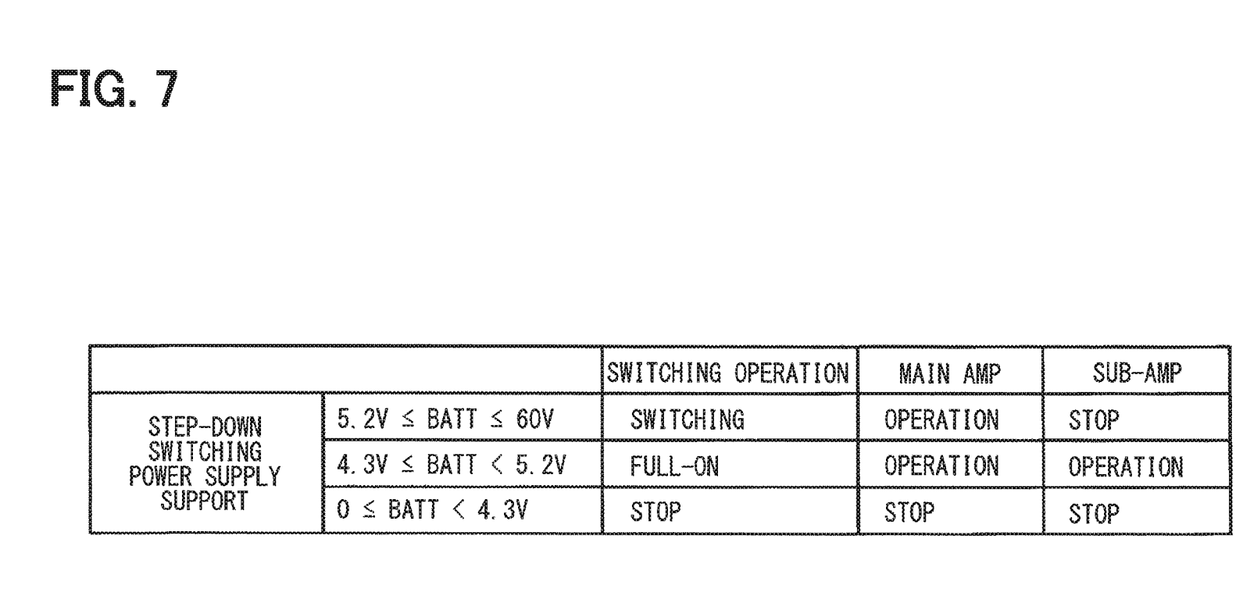
FIG. 7 is a matrix diagram showing schematically an operation of the power supply device during a period of falling of a battery voltage.

An operation of the configuration described above will be described with reference to FIG. 6 and FIG. 7. FIG. 6 is for explaining an operation sequence of the power supply device 6 and does not indicate accurate voltage values and the like. In FIG. 6 and FIG. 7, the main amplifier 12 is indicated as MAIN AMP and the sub-amplifier 13 is indicated as SUB-AMP. Here, individual operations of the switching power supply 11, the main amplifier 12 and the sub-amplifier 13 will be described first and then a whole operation of the power supply device 6 will be described.

[1] Operation of Switching Power Supply 11

The SW power supply control part 15 controls an operation of the switching power supply 11 as follows in accordance with the voltage BATT or the voltage VB. That is, when the voltage BATT or the voltage VB is equal to or higher than 0V and lower than 5.5V during a voltage rise period, during which the voltage BATT or the voltage VB rises as in activation time of the power supply device 6, the SW power supply control part 15 controls the switching power supply 11 to stop operating by turning off the transistor T1. Thus, the power supply circuit 18 outputs the voltage VOM5 having a low voltage value, with which the internal circuits cannot operate. As a result, the internal circuits are prevented from operating erroneously.

After the voltage BATT or the voltage VB reached 5.5V during the voltage rise period, the SW power supply control circuit 15 controls the transistor T1 to execute the switching operation by turning on and off with a predetermined duty so that the voltage POW2 is regulated to a target value. Thus the voltage VOM5, which is in the normal range, is outputted from the power supply circuit 18 and the internal circuits, to which the voltage VOM5 is supplied, are enabled to operate.

Further, when the voltage BATT or the voltage VB is equal to or higher than 5.2 V and equal to or lower than 60V during a voltage fall period, during which the voltage BATT or the voltage VB falls, the SW power supply control part 15 controls the switching power supply 11 to execute the switching operation. In this case also, the voltage VOM5, which is in the normal range, is outputted from the power supply circuit 18 and the internal circuits are enabled to operate.

When the voltage BATT or the voltage VB is equal to or higher than 3.0V and lower than 5.2V during the voltage fall period, the SW power supply control part 15 drives the transistor T1 to turn on fully. Thus the voltage POW2 of the voltage value, which is generally equal to the voltage BATT (=voltage VB), is supplied to the power supply circuit 18. For this reason, the power supply circuit 18 can output the voltage VOM5 having a minimum voltage value, with which the internal circuits are operable, although it is lower than the target value (5.0V).

Further, when the voltage BATT falls to be lower than 3V during the voltage fall period, the SW power supply control part 15 controls the switching power supply 11 to stop its operation by turning off the transistor T1. Thus, the power supply circuit 18 outputs the voltage VOM5 having the low voltage value, with which the internal circuits cannot operate. As a result, the internal circuits are prevented from operating erroneously.

[2] Operation of Main Amplifier 12

When the voltage BATT or the voltage VB is lower than 4.0V, the main amplifier 12 stops an operation of outputting the first voltage V1. When the voltage BATT or the voltage VB is equal to or higher than 4.0V, the main amplifier 12 executes the operation of outputting the first voltage V1. The switching over of operations of the main amplifier 12 described above is controlled by the switchover control part 14 as described above.

[3] Operation of Sub-Amplifier 13

When the voltage BATT or the voltage VB is equal to or higher than 3.0V and lower than 5.2V during the voltage fall period, that is, during the full-on period, during which the switching power supply 11 is driven to turn on fully, the sub-amplifier 13 executes an operation of outputting the second voltage V2. The sub-amplifier 13 stops the operation of outputting the second voltage V2 during a period other than the full-on period. The switching over of operations of the sub-amplifier 13 described above is controlled by the switchover control part 14 as described above.

[4] Whole Operation During IGOFF Period

Since the main relay 3 is turned off during the IGOFF period, during which the ignition switch is in the off-state, the operations of outputting the voltage of the switching power supply 11 and the sub-amplifier 13 are stopped. However, since the voltage is supplied to the main amplifier 12 at all times even during the IGOFF period, the operation of outputting the first voltage V1 is executed. For this reason, during the IGOFF period, the first voltage V1 outputted from the main amplifier 12 is outputted from the output terminal P14 as the voltage AMP OUT.

[5] Whole Operation During IGON Period

Since the main relay 3 is turned on during the IGON period, in which the ignition switch is in the on-state, the switching power supply 11 and the sub-amplifier 13 are enabled to execute the voltage outputting operations. However, as described above, the sub-amplifier 13 stops the operation of outputting the second voltage V2 during the period other than the full-on period, during which the switching power supply 11 is driven to turn on fully. For this reason, similarly to the period other than the full-on period in the IGON period, the first voltage V1 outputted from the main amplifier 12 is outputted from the output terminal P14 as the voltage AMP OUT. For this reason, the operation of outputting the voltage AMP OUT is executed by only the main amplifier 12. The sub-amplifier 13 does not operate as opposed to a case described later.

On the other hand, during the full-on period in the IGON period, the main amplifier 12 and the sub-amplifier 13 both operate. For this reason, during the full-on period in the IGON period, a higher one of the first voltage V1 outputted from the main amplifier 12 and the second voltage V2 outputted from the sub-amplifier 13 is outputted from the output terminal P14 as the voltage AMP OUT.

However, the voltage BATT is as low as about 5.2V to 3.0V during the full-on period. For this reason, the main amplifier 12, the minimum operating voltage of which is comparatively high, can only output the first voltage V1, the voltage value of which is lower than the normal range. On the other hand, the sub-amplifier 13, the minimum operating voltage of which is comparatively low, can output the second voltage V2, the voltage value of which is in the normal range or close to the minimum operating voltage. For this reason, during the full-on period in the IGON period, the second voltage V2 outputted from the sub-amplifier 13 is outputted from the output terminal P14 as the voltage AMP OUT. At this time, the sub-amplifier 13 operates to support the operation of outputting the voltage AMP OUT thereby supplementing inoperativeness of the main amplifier 12 because of its low minimum operating voltage.

According to the present embodiment described above, the following advantages are provided. In the power supply device 6, during the IGOFF period, the operation of the main amplifier 12 is executed and the operation of the sub-amplifier 13 is stopped. Thus, during the IGOFF period, the voltage AMP OUT is outputted to the computer 4 by the operation of the main amplifier 12, the consumption current of which is smaller than that of the sub-amplifier 13. The power supply device 6 therefore can supply power to the computer 4 with the low consumption current during the IGOFF period.

The main amplifier 12 has a demerit that its minimum operating voltage is higher than that of the sub-amplifier 13. However, it never occurs that cranking is executed during the IGOFF period. For this reason, during the IGOFF period, it is unlikely that the voltage BATT rapidly falls. Thus, even when the voltage supply is executed by the main amplifier 12, the minimum operating voltage of which is high, outputting of the voltage AMP OUT is disabled.

Further, in the power supply device 6, both operations of the main amplifier 12 and the sub-amplifier 13 are executed during the IGON period and the period, during which the switching power supply 11 is driven in the full-on state. The switching power supply 11 is configured to be driven in the full-on state in such a case that the voltage BATT is lower than 5.2V during the voltage fall period, that is, the voltage BATT falls rapidly because of the cranking and the like. For this reason, in case that the voltage BATT falls rapidly in the IGON period, the voltage AMP OUT is supplied to the computer 4 by not only the operation of the main amplifier 12 but also the support operation of the sub-amplifier 13. Therefore, even when the voltage BATT falls to be lower than the minimum operating voltage of the main amplifier 12 because of cranking and the like in the IGON period, it is possible to continue to supply the voltage AMP OUT to the computer 4 by the operation of the sub-amplifier 13, the minimum operating voltage of which is lower than that of the main amplifier 13.

As described above, according to the power supply device 6 of the present embodiment, it is advantageous that the minimum operating voltage can be lowered during the IGON period while reducing the consumption current during the IGOFF period. This advantage is remarkable in the configuration, in which the power supply is received from the battery 2 mounted in the vehicle, like the power supply device 6 of the present embodiment. Specifically, since it is preferred to reduce consumption of the power of the battery 2 during the IGOFF period, it is very effective that the consumption current during the IGOFF period can be maintained to be low. Further, since the voltage BATT of the battery 2 is likely to fall rapidly because of cranking, it is also very effective that the minimum operating voltage is lowered during the IGON period.

Since a high voltage, which is about 60V at a maximum, is supplied occasionally, the main amplifier 12 need be formed of using components of high withstanding voltages. However, since the main amplifier 12 is formed of using the N-channel type transistor T2 as the voltage control switching component, it is advantageous that a chip size can be reduced. For this reason, from a total standpoint, a circuit area of the main amplifier 12 can be reduced.

For generating the voltage VOM5 from the voltage VB supplied from the battery 2, the power supply device 6 includes the switching power supply 11 and the power supply circuit 18. In this case, the switching power supply 11 steps down the voltage VB, which is likely to rise up to about 60V at a maximum, to about 6V and supplies the stepped-down voltage POW2 to the power supply circuit 18 of the series regulator type. The power supply circuit 18 generates the voltage VOM5 from the voltage POW2. With this configuration, it is possible to generate the stabilized voltage VOM5 efficiently, that is, with low loss. The sub-amplifier 13 is configured to operate by receiving the voltage POW2, which is outputted from the above-described switching power supply 11. This configuration provides the following advantageous effects.

That is, since the sub-amplifier 13 is configured to use the P-channel type transistor T4 as the voltage control switching component, it is advantageous that the minimum operating voltage can be lowered but disadvantageous that the chip size is enlarged. However, since the sub-amplifier 13 is configured to operate by receiving the supply of the voltage POW2 outputted from the switching power supply 11, it may use a component of low withstanding voltage because of a low voltage supply of about 6V at a maximum. It is therefore possible to reduce the circuit area of the sub-amplifier 13 from the total standpoint.

The first power supply 16 of the main amplifier 12 may be formed of the BGR, which operates by receiving the voltage AMP OUT of the output terminal P14. With this configuration, since only a low voltage of about 3.3V is supplied to the first reference voltage supply 16, it is possible to configure the first reference voltage supply 16 with components of low withstanding voltages and reduce the circuit area.

The second reference voltage supply 17 of the sub-amplifier 17 may be formed of the BGR, which operates by receiving the voltage POW2 of the output terminal P12 or the voltage AMP OUT of the output terminal P14. With this configuration, since only low voltages of about 6.0 or 3.3V is supplied to the second reference voltage supply 17, it is possible to configure the second reference voltage supply 17 with components of low withstanding voltages and reduce the circuit area. Further, in case that the second reference voltage supply 17 is formed of the BGR, which operates by receiving the voltage AMP OUT, it is possible to reduce the circuit area by sharing a common BGR with the first reference voltage supply 16 owing to sharing of the BGR.

Second Embodiment

Figure 8:
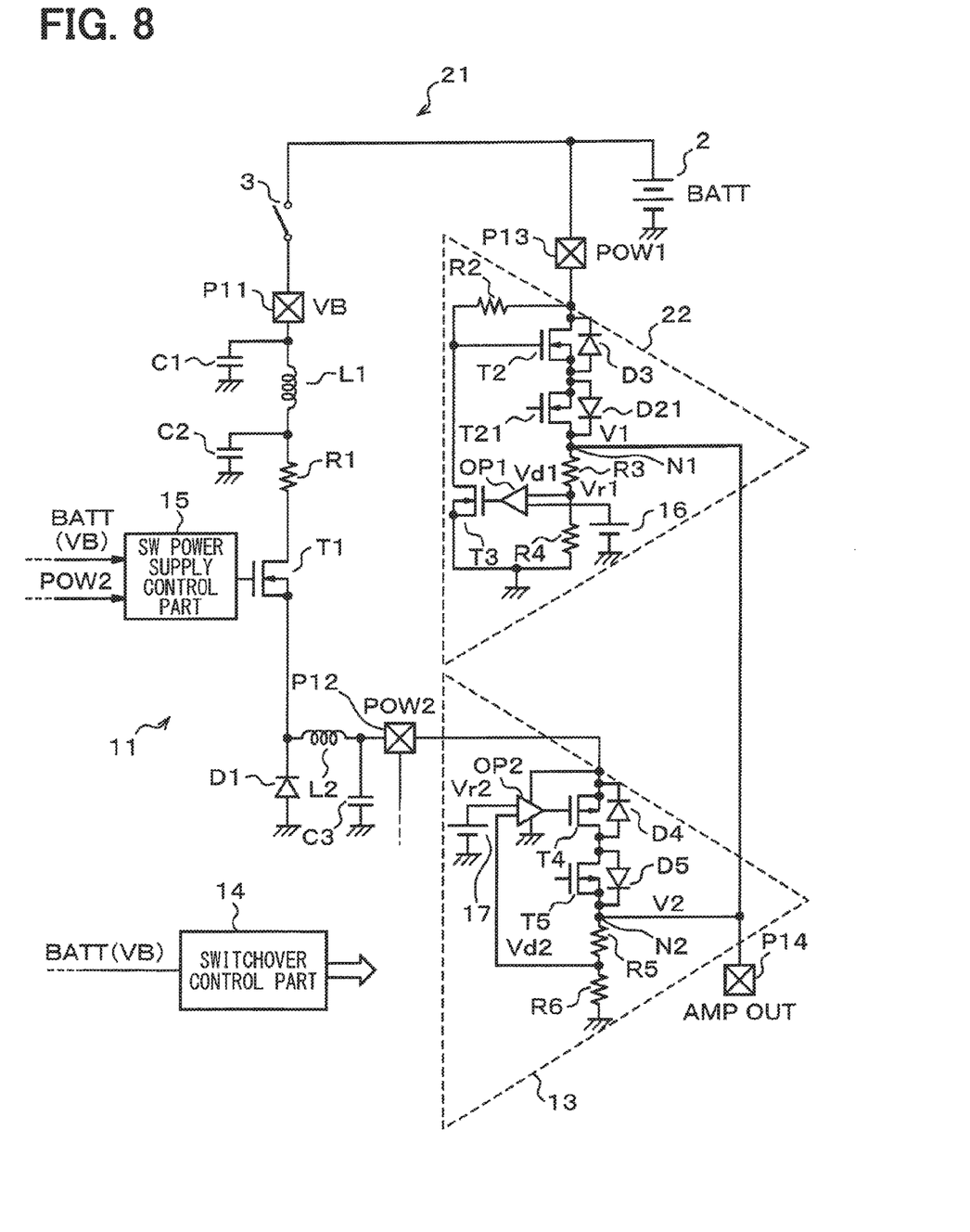
FIG. 8 is a diagram showing schematically a power supply device according to a second embodiment.

A second embodiment will be described next with reference to FIG. 8. As shown in FIG. 8, a power supply device 21 according to the present embodiment is different from the power supply device 6 according to the first embodiment in that a main amplifier 22 is provided in place of the main amplifier 12. The input terminal P13 of the main amplifier 22 is connected directly to the high-potential side terminal of the battery 2. For this reason, the voltage POW1, which has the same voltage value as the voltage BATT of the battery 2, is supplied to the main amplifier 22 at all times.

The main amplifier 22 includes a transistor T21 in addition to the configuration of the main amplifier 12. The transistor T21 is an N-channel type MOS transistor. In this case, sources of the transistors T2 and T21 are connected commonly. A drain of the transistor T21 is connected to the output node N1. A diode D21 is formed in a drain-source path of the transistor T21 with its anode at the source side. The transistor T21 is interposed in series with a voltage input-output path in the main amplifier 22 and corresponds to a reverse-flow blocking MOS transistor for blocking a reverse flow of current from the output node N1 side.

Driving of the transistor T21 is controlled by a driving control part, which is not shown. In this case, the transistor T21 is turned on at normal time and turned off at abnormal time when an abnormality arises. Thus, at the abnormal time, voltage feedback control is executed so that the first voltage V1 is regulated to the target value by driving control of the transistor T3 by the operational amplifier OP1. Further, even when an abnormality like electric connection of the output terminal P14 to the high-potential side arises, the reverse flow of current from the node N1 side is blocked by the body diode D21 of the transistor T21.

In the configuration described above, the body diode D21 is interposed in the forward direction in the voltage input-output path of the main amplifier 22 and the body diode D5 is interposed in the forward direction in the voltage input-output path of the sub-amplifier 13. That is, in the configuration of the present embodiment, the outputs of the main amplifier 22 and the sub-amplifier 13 are OR-connected. Thus, the present embodiment also provides the similar operation and advantage as the first embodiment.

Other Embodiment

The present disclosure is not limited to the embodiments described above and shown in the drawings but may be modified, combined or expanded arbitrarily without departing from the spirit of the disclosure.

The transistors T2 and T21 may be NPN type bipolar transistors. In case of changing the transistor T21 to the bipolar transistor, it is preferred to add a diode between an emitter and a collector of the bipolar transistor with an anode of the diode at the collector side. According to this configuration, the diode D2 connected between the input terminal P13 and the battery 2 need not be provided.

The transistors T4 and T5 may be PNP type bipolar transistors. However, in case of changing the transistor T5 to the bipolar transistor, it is required to add a diode between an emitter and a collector of the bipolar transistor with an anode of the diode at the collector side.

The present disclosure is not limited to the power supply device 6 provided in the electronic control unit 1 mounted in the vehicle but may be applied to any kinds of power supply devices. Although the present disclosure is made in correspondence to the embodiments, it is to be understood that the present disclosure is not limited to the above-described embodiments and configurations. The present disclosure includes various modifications and equivalent arrangements. In addition, while the various combinations and configurations, other combinations and configurations, including more, less or only a single element, are also within the spirit and scope of the present disclosure.

The invention claimed is:

1. A power supply device comprising:
a first linear regulator for receiving a voltage from a direct-current power supply at all times and outputting a first voltage;
a switching regulator of a step-down type for receiving the voltage from the direct-current power supply through a path via a power supply switch and outputting an intermediate voltage; and
a second linear regulator for receiving the intermediate voltage and outputting a second voltage, wherein:
the power supply device is configured to output a higher one of the first voltage and the second voltage through an output terminal;
the first linear regulator is configured to have a smaller consumption current and a higher minimum operating voltage than those of the second linear regulator;
the switching regulator is configured to drive a main switching element, which is interposed in series with a voltage input-output path of the switching regulator, to turn on at all times, when the voltage supplied from the direct-current power supply is equal to or lower than a predetermined value;
the second linear regulator executes an outputting operation of the second voltage during a full-on period, in which the main switching element of the switching regulator is turned on at all times.

2. The power supply device according to claim 1, wherein:
the first linear regulator is formed of an N-channel type MOS transistor or an NPN type bipolar transistor as a voltage control switching element, which is interposed in series with a voltage input-output path of the first linear regulator; and
the second linear regulator is formed of a P-channel type MOS transistor or a PNP type bipolar transistor as the voltage control switching element.

3. The power supply device according to claim 1, wherein:
each of the first linear regulator and the second linear regulator includes a reverse-flow blocking MOS transistor, which is interposed in series with the voltage input-output path.

4. The power supply device according to claim 1, wherein:
the first linear regulator includes a first reference voltage supply for generating a first reference voltage, which corresponds to a target value of the first voltage; and
the first reference voltage supply is configured to operate by receiving a voltage of the output terminal.

5. The power supply device according to claim 1, wherein:
the second linear regulator includes a second reference voltage supply for generating a second reference voltage, which corresponds to a target value of the second voltage; and
the second reference voltage supply is configured to operate by receiving the intermediate voltage.

6. The power supply device according to claim 1, wherein:
the second linear regulator includes a second reference voltage supply for generating a second reference voltage, which corresponds to a target value of the second voltage; and
the second reference voltage supply is configured to operate by receiving a voltage of the output terminal.

7. The power supply device according to claim 1, wherein:
the second linear regulator includes a power supply voltage detection part for detecting a voltage of the direct-current power supply and checks whether a detection result of the power supply voltage detection part indicates the full-on period of the main switching component.

8. The power supply device according to claim 1, wherein:
- the direct current power supply is a battery mounted in a vehicle; and
- the power supply switch is turned on and off in conjunction with an ignition switch of the vehicle.

9. The power supply device according to claim 8, wherein:
- the first linear regulator includes a first reference voltage supply for generating a first reference voltage, which corresponds to a target value of the first voltage;
- the first reference voltage supply is configured to operate by receiving a voltage of the output terminal;
- the second linear regulator includes a second reference voltage supply for generating a second reference voltage, which corresponds to a target value of the second voltage;
- the second reference voltage supply is configured to operate by receiving the intermediate voltage or a voltage of the output terminal; and
- the second linear regulator includes a power supply voltage detection part for detecting a voltage of the direct-current power supply and checks whether a detection result of the power supply voltage detection part indicates the full-on period of the main switching component.

10. An electronic control unit comprising:
the power supply device according to claim 1; and
a control part for executing predetermined control by receiving power from the power supply.

* * * * *